(12) United States Patent
Royston

(10) Patent No.: US 9,209,867 B2
(45) Date of Patent: Dec. 8, 2015

(54) DEVICE FOR AUTHENTICATING WANTED NFC INTERACTIONS

(75) Inventor: Philip Stewart Royston, Newbury (GB)

(73) Assignee: Broadcom Corporation, Irvine, CA (US)

( * ) Notice: Subject to any disclaimer, the term of this patent is extended or adjusted under 35 U.S.C. 154(b) by 669 days.

(21) Appl. No.: 13/171,023

(22) Filed: Jun. 28, 2011

(65) Prior Publication Data
US 2013/0005243 A1 Jan. 3, 2013

(51) Int. Cl.
*H04B 5/00* (2006.01)
*H04B 7/00* (2006.01)
*H04W 12/06* (2009.01)
*H04L 29/06* (2006.01)

(52) U.S. Cl.
CPC ............ *H04B 5/0043* (2013.01); *H04B 5/0075* (2013.01); *H04L 63/061* (2013.01); *H04W 12/06* (2013.01)

(58) Field of Classification Search
USPC .......... 455/41.1, 41.2, 552.1, 426, 509, 41.3, 455/466, 422, 103; 370/255, 329, 341, 338
See application file for complete search history.

(56) References Cited

U.S. PATENT DOCUMENTS

| 5,719,664 | A * | 2/1998 | Besesty et al. | 356/5.01 |
|---|---|---|---|---|
| 8,358,596 | B2 * | 1/2013 | Byrne et al. | 370/255 |
| 8,839,389 | B2 * | 9/2014 | Cohen et al. | 726/7 |
| 2004/0183787 | A1 * | 9/2004 | Geaghan et al. | 345/173 |
| 2004/0233043 | A1 * | 11/2004 | Yazawa et al. | 340/10.3 |
| 2005/0059345 | A1 * | 3/2005 | Palin et al. | 455/41.2 |
| 2007/0008140 | A1 * | 1/2007 | Saarisalo et al. | 340/572.7 |
| 2009/0247077 | A1 * | 10/2009 | Sklovsky et al. | 455/41.1 |
| 2010/0068996 | A1 * | 3/2010 | Haartsen | 455/41.1 |
| 2010/0081385 | A1 * | 4/2010 | Lin et al. | 455/41.3 |
| 2010/0291871 | A1 * | 11/2010 | Butler | 455/41.1 |
| 2011/0287714 | A1 * | 11/2011 | Wilson et al. | 455/41.1 |
| 2012/0062499 | A1 * | 3/2012 | Weaver et al. | 345/174 |

* cited by examiner

*Primary Examiner* — Ganiyu A Hanidu
(74) *Attorney, Agent, or Firm* — Sterne, Kessler, Goldstein & Fox PLLC

(57) ABSTRACT

An electronic device that includes a sensor module, a measuring module and a near field communication (NFC) device. The sensor module receives an input signal. The measuring module measures the strength of the input signal and determines whether the input meets a predefined threshold. If the strength of the input signal meets the predefined threshold, the measuring module activates the NFC device. If the strength of the input signal does not meet the predefined threshold, the measuring module de-activates the NFC device.

25 Claims, 10 Drawing Sheets

DEVICE FOR AUTHENTICATING WANTED NFC INTERACTIONS

BACKGROUND

1. Field of Invention

The invention relates to near field communication (NFC) devices, and more specifically to enabling and disabling the NFC device to prevent unauthorized use.

2. Related Art

Near field communication (NFC) devices are being integrated into communication devices, such as mobile devices to provide an example, to facilitate the use of these communication devices in conducting daily transactions. For example, instead of carrying numerous credit cards, the credit information provided by these credit cards could be stored onto an NFC device. The NFC device is simply tapped to a credit card terminal to relay the credit information to it to complete a transaction. As another example, a ticket writing system, such as those used in bus and train terminals, may simply write ticket fare information onto the NFC device instead of providing a ticket to a passenger. The passenger simply taps the NFC device to a reader to ride the bus or the train without the use of a paper ticket.

Generally, NFC requires that NFC devices are present within a relatively small distance from one another so that their corresponding magnetic fields can exchange information. Typically, the first NFC device transmits or generates a magnetic field modulated with the information, such as the credit information or the ticket fare information. This magnetic field inductively couples the information onto a second NFC device that is proximate to the first NFC device. The second NFC device may respond to the first NFC device by inductively coupling its corresponding information onto the first NFC device.

As NFC devices are being used to conduct daily transactions that include sensitive information, such as, for example, credit card or bank account numbers, user addresses, etc., there is a risk of the information being stolen from the NFC device in a way that is transparent to the owner of the NFC device. The threat exists as the attacker need only be in a physical proximity of the NFC device and need not physically touch or interact with a victim or with the NFC device of the victim. For example, an attacker may execute an electronic pick pocket on a victim carrying an NFC device in his pocket, a bag or a brief case. The attacker could use the NFC device of a genuine owner to make contactless purchases at a legitimate vendor that is remote from the NFC device that is under a control of the victim.

For instance, a first attacker may walk next to the victim carrying an NFC device in his pocket that acts as a "leech." The first attacker uses the "leech" NFC device to make contact with the NFC device of the victim. At the same time, a second attacker may walk around with a "ghost" NFC device that detects a radio frequency ("RF") signal and command data from a legitimate NFC device reader, at for example, an ATM or a credit card reader of a legitimate vendor. The "ghost" NFC device receives RF signal and command data from the legitimate vendor, re-modulates the command data and rebroadcasts the reader signal to the "leech" NFC device.

The "leech" NFC device receives the re-broadcasted signal and command data from the "ghost" NFC device, de-modulates and amplifies the signal, and becomes a copy of a legitimate reader in real-time. The "leech" NFC device may amplify the signal, using, for example, a large low frequency ("LF") or high frequency ("HF") coil to increase the range of the rebroadcasted signal from, for example, two feet to one hundred feet or more.

As the unsuspecting victim (the owner of the NFC device) carries his NFC device, the NFC tag of his NFC device responds to the "leech" NFC device as though the "leech" NFC device was a genuine tag reader. Once the "leech" receives the NFC tag signal from the NFC device of a victim, the "leech" de-modulates the signal and transmits the signal to the "ghost" NFC device. The "ghost" NFC device receives the signal from the "leech" device and uses the signal to load modulate its coil and respond to the legitimate reader as though the "ghost" NFC device included an NFC tag of a legitimate NFC device of the owner.

Conventional systems attempt to prevent these types of electronic attacks by having the owner of the NFC device activate the NFC device prior to use. For example, the NFC device owner may be asked to turn on the tag mode of the NFC device, using, for example, the phone menu system on the communication device or opening the communication device. However, activating NFC device prior to executing a transaction may be burdensome on the consumer and degrade the consumer experience. Thus, there is a need for systems and methods that activate and deactivate the NFC device in a way that is seamless to the owner.

BRIEF DESCRIPTION OF THE DRAWINGS/FIGURES

Embodiments of the invention are described with reference to the accompanying drawings. In the drawings, like reference numbers indicate identical or functionally similar elements. Additionally, the left most digit(s) of a reference number identifies the drawing in which the reference number first appears.

Figure 8A:
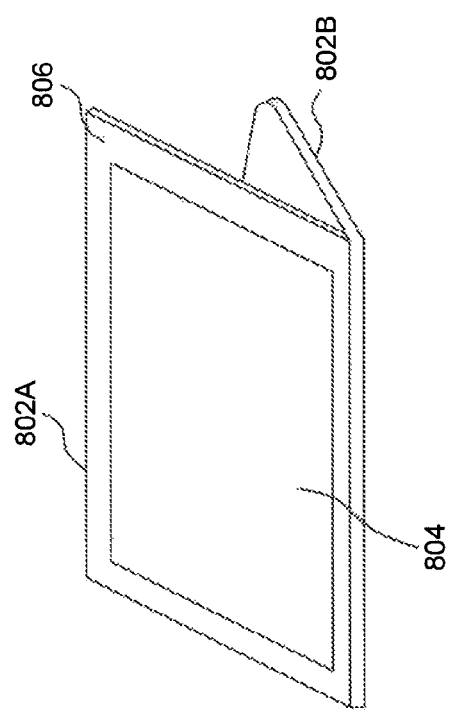
Figure 8B:
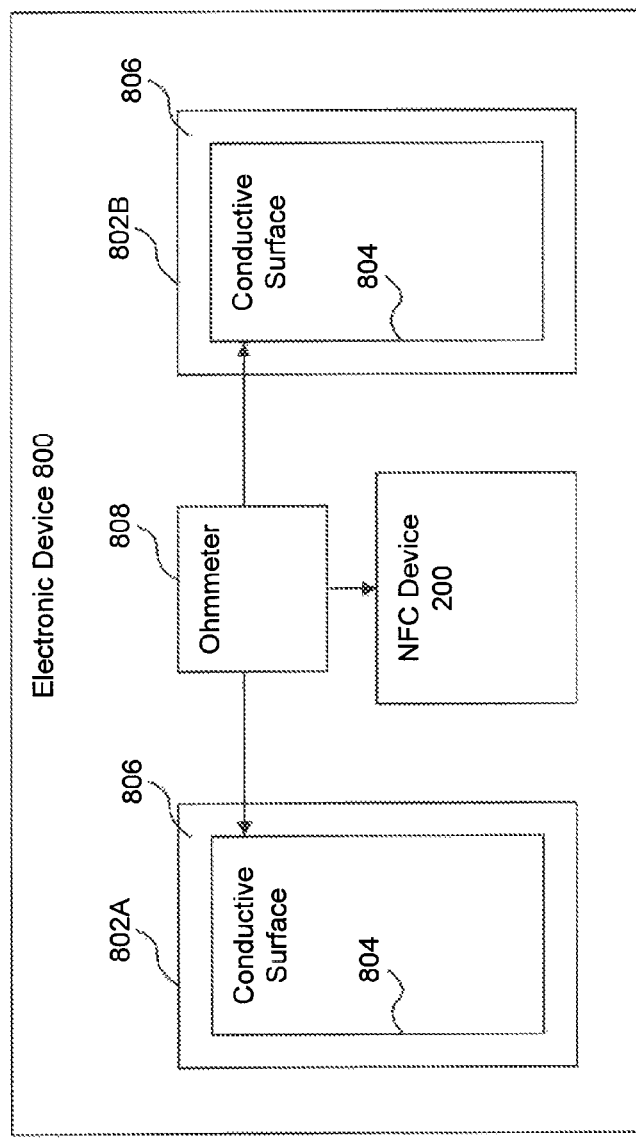

FIGS. 8A-B illustrate a block diagram of electronic device 800 that includes a conductive material on casings to activate an NFC device, according to an exemplary embodiment of the invention.

Figure 9:
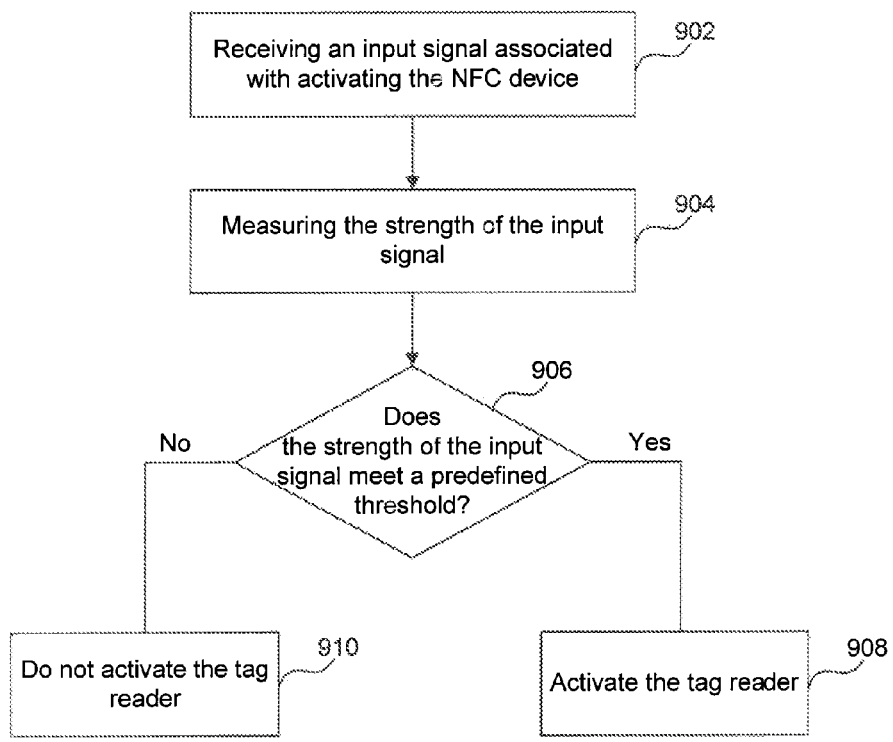

FIG. 9 is a flowchart of a method for activating an NFC device, according to an exemplary embodiment of the invention.

The invention will now be described with reference to the accompanying drawings. In the drawings, like reference numbers generally indicate identical, functionally similar,

DETAILED DESCRIPTION OF THE INVENTION and/or structurally similar elements. The drawing in which an element first appears is indicated by the leftmost digit(s) in the reference number.

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions, etc. may be described herein as performing certain actions. However, it should be appreciated that such descriptions are merely for convenience and that such actions in fact result from computing devices, processors, controllers, or other devices executing the firmware, software, routines, instructions, etc.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although the description of the present invention is to be described in terms of an NFC device, those skilled in the relevant art(s) will recognize that the present invention may be applicable to other communications, such as radio-frequency identification ("RFID") devices, that use the near field and/or far field without departing from the spirit and scope of the present invention. For example, although the present invention is to be described using NFC devices, those skilled in the relevant art(s) will recognize that functions of these NFC devices may be applicable to other communications devices that use the near field and/or the far field without departing from the spirit and scope of the present invention.

Figure 1:
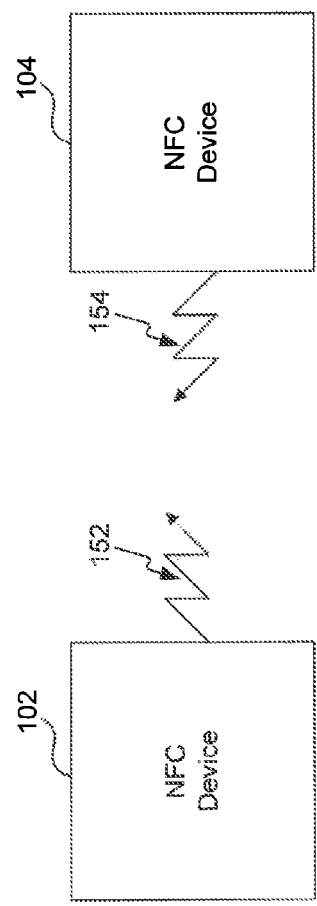
FIG. 1 illustrates a block diagram of an NFC environment, according to an exemplary embodiment of the invention.

FIG. 1 illustrates a block diagram of an NFC environment 100 according to an exemplary embodiment of the invention. NFC environment 100 provides wireless communication of information, such as one of commands and/or data, among a first NFC device 102 and a second NFC device 104 that are sufficiently proximate to each other. The first NFC device 102 and/or the second NFC device 104 may be implemented as a standalone or a discrete device or may be incorporated within or coupled to another electrical device or host device such as a mobile telephone, a portable computing device, another computing device such as a personal, a laptop, or a desktop computer, a computer peripheral such as a printer, a portable audio and/or video player, a payment system, a ticket writing system such as a parking ticketing system, a bus ticketing system, a train ticketing system or an entrance ticketing system to provide some examples, or in a ticket reading system, a toy, a game, a poster, packaging, advertising material, a product inventory checking system and/or any other suitable electronic device that will be apparent to those skilled in the relevant art(s) without departing from the spirit and scope of the invention.

Conventionally, an operator may operate and/or control the first NFC device 102 and/or the second NFC device 104 using a user interface, such as a touch-screen display, an alphanumeric keypad, a microphone, a mouse, a speaker, any other suitable user interface that will be apparent to those skilled in the relevant art(s) without departing from the spirit and scope of the invention, or any combination thereof. The user interface may be configured to allow the operator to provide information, such as data and/or one or more commands to provide some examples, to the first NFC device 102 and/or the second NFC device 104. Herein, information includes data that is to be transferred from a first NFC-capable device to a second NFC-capable device, data that is to be stored or used by the first NFC-capable device and/or the second NFC-capable device, data that is to be provided to the first NFC-capable device and/or the second NFC-capable device, data that is to be provided to an operator of the first NFC-capable device and/or the second NFC-capable device, or any combination thereof. Herein, an NFC-capable device refers to an electrical device or host device that is integrated with an NFC device or the NFC device itself.

The information may also include one or more commands to be executed by the first NFC-capable device and/or the second NFC-capable device. The user interface may be configured to provide the information from the first NFC device 102 and/or the second NFC device 104 to the operator.

The first NFC device 102 and/or the second NFC device 104 interact with each other to exchange the information in a peer-to-peer (P2P) communication mode or a reader/writer (R/W) communication mode. In the P2P communication mode, the first NFC device 102 and the second NFC device 104 may be configured to operate according to an active communication mode and/or a passive communication mode. The first NFC device 102 modulates its corresponding information onto a first carrier wave, referred to as a modulated information communication, and generates a first magnetic field by applying the modulated information communication to the first antenna to provide a first information communication 152. The first NFC device 102 ceases to generate the first magnetic field after transferring its corresponding information to the second NFC device 104 in the active communication mode. Alternatively, in the passive communication mode, the first NFC device 102 continues to apply the first carrier wave without its corresponding information, referred to as an unmodulated information communication, to continue to provide the first information communication 152 once the information has been transferred to the second NFC device 104.

The first NFC device 102 is sufficiently proximate to the second NFC device 104 such that the first information communication 152 is inductively coupled onto a second antenna of the second NFC device 104. The second NFC device 104 demodulates the first information communication 152 to recover the information. The second NFC device 104 may respond to the information by modulating its corresponding information onto a second carrier wave and generating a second magnetic field by applying this modulated information communication to the second antenna to provide a second modulated information communication 154 in the active communication mode. Alternatively, the second NFC device 104 may respond to the information by modulating the second antenna with its corresponding information to modulate the first carrier wave to provide the second modulated information communication 154 in the passive communication mode.

In the R/W communication mode, the first NFC device 102 is configured to operate in an initiator, or reader, mode of operation and the second NFC device 104 is configured to operate in a target, or tag, mode of operation. However, this example is not limiting, those skilled in the relevant art(s) will recognize that the first NFC device 102 may be configured to operate in the tag mode and the second NFC device 104 may be configured to operate in the reader mode in accordance with the teachings herein, without departing from the spirit and scope of the present invention. The first NEC device 102 modulates its corresponding information onto the first carrier wave and generates the first magnetic field by applying the modulated information communication to the first antenna to provide the first information communication 152. The first NFC device 102 continues to apply the first carrier wave without its corresponding information to continue to provide the first information communication 152 once the information has been transferred to the second NFC device 104. The first NFC device 102 is sufficiently proximate to the second NFC device 104 such that the first information communication 152 is inductively coupled onto a second antenna of the second NFC device 104.

The second NFC device 104 derives or harvests power from the first information communication 152 to recover, to process, and/or to provide a response to the information. The second NFC device 104 demodulates the first information communication 152 to recover and/or to process the information. The second NFC device 104 may respond to the information by modulating the second antenna with its corresponding information to modulate the first carrier wave to provide the second modulated information communication.

Further operations of the first NFC device 102 and/or the second NFC device 104 may be described in International Standard ISO/IE 18092:2004(E), "Information Technology—Telecommunications and Information Exchange Between Systems—Near Field Communication—Interface and Protocol (NFCIP-1)," published on Apr. 1, 2004 and International Standard ISO/IE 21481:2005(E), "Information Technology—Telecommunications and Information Exchange Between Systems—Near Field Communication—Interface and Protocol-2 (NFCIP-2)," published on Jan. 15, 2005, each of which is incorporated by reference herein in its entirety.

Figure 2:
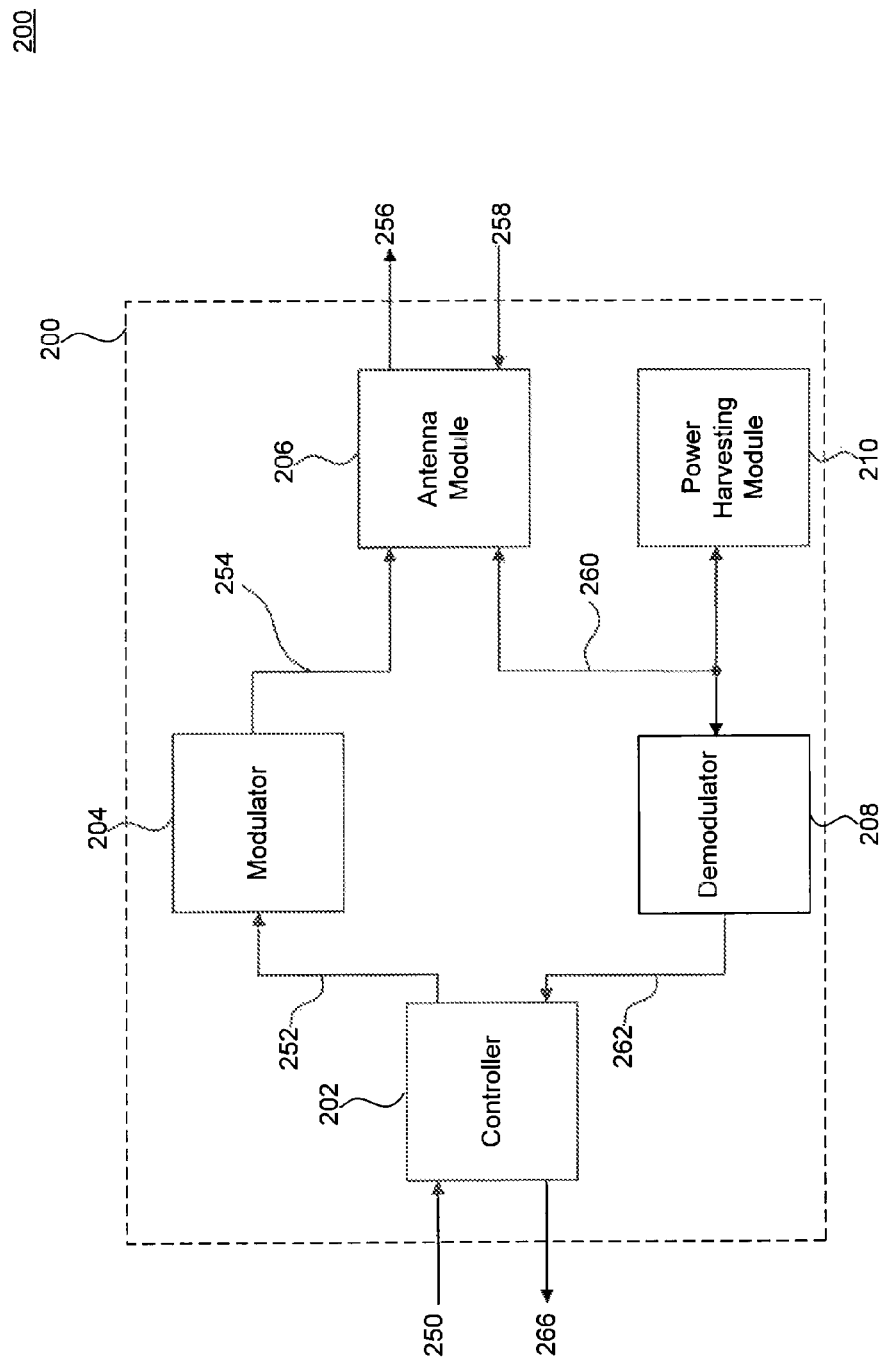
FIG. 2 illustrates a block diagram of an NFC device that is implemented as part of the NFC environment, according to an exemplary embodiment of the invention.

FIG. 2 illustrates a block diagram of a first NFC device that is implemented as part of the NFC environment, according to an exemplary embodiment of the invention. An NFC device 200 is configured to operate in a reader mode of operation to initiate an exchange of information, such as data and/or one or more commands to provide some examples, with other NFC devices. An NFC device 200 may also be is configured to operate in a target, or tag, mode of operation to respond to a request to exchange information, such as data and/or one or more commands to provide some examples, with another NFC-capable device. NFC device 200 may also be configured to operate in a communicator mode of operation to initiate an exchange of information, such as data and/or one or more commands to provide some examples, with other NFC-capable devices and to respond to a request to exchange the information from other NFC-capable devices.

An operator may operate and/or control the NFC device 200 using a user interface and/or may touch, or be sufficiently proximate to, an antenna module of the NFC device 200. For example, the operator may provide information to the NFC device 200 by touching, or being sufficiently proximate to, the antenna module. The NFC device 200 includes a controller module 202, a modulator module 204, an antenna module 206, a demodulator module 208, and, optionally, a power harvesting module 268. The NFC device 200 may represent an exemplary embodiment of the first NFC device 102 and/or the second NFC device 104.

The controller module 202 controls overall operation and/or configuration of the NFC device 200. The controller module 202 receives information 250 from one or more data storage devices such as one or more contactless transponders, one or more contactless tags, one or more contactless smartcards, or any other machine-readable mediums that will be apparent to those skilled in the relevant art(s) without departing from the spirit and scope of the invention, or any combination thereof. The other machine-readable medium may include, but is not limited to, read only memory (ROM), random access memory (RAM), magnetic disk storage media, optical storage media, flash memory devices, electrical, optical, acoustical or other forms of propagated signals such as carrier waves, infrared signals, digital signals to provide some examples. The controller module 202 may also receive the information 250 from a user interface such as a touch-screen display, an alphanumeric keypad, a microphone, a mouse, a speaker, any other suitable user interface that will be apparent to those skilled in the relevant art(s) without departing from the spirit and scope of the invention to provide some examples. The controller module 202 may further receive the information 250 from other electrical devices or host devices coupled to the NFC device 200.

Typically, the controller module provides the information 250 as transmission information 252 for transmission to another NFC-capable device. However, the controller module 202 may also use the information 250 to control the overall operation and/or configuration of the NFC device 200. For example, the controller module 202 may issue and/or execute the one or more commands in accordance with the data, if appropriate, to control operations of the NFC device 200, such as a transmission power, a transmission data rate, a transmission frequency, a modulation scheme, a bit and/or a byte encoding scheme and/or any other suitable operation parameter that will be apparent to those skilled in the relevant art(s) without departing from the spirit and scope of the invention, of other NFC-capable devices.

Additionally, the controller module 202 may format the information 250 into information frames and may perform error encoding, such as cyclic redundancy check (CRC) to provide an example, on the information frames to provide the transmission information 252. The information frames may include frame delimiters to indicate a start and/or an end of each of the information frames. The controller module 202 may additionally arrange multiple information frames to form sequences of information frames to synchronize and/or to calibrate the NFC device 200 and/or another NFC-capable device. The sequences may include sequence delimiters to indicate a start and/or an end of each of the sequences.

The modulator module 204 modulates the transmission information 252 onto a carrier wave, such as a radio frequency carrier wave having a frequency of approximately 13.56 MHz to provide an example, using any suitable analog or digital modulation technique to provide a modulated information communication as transmission information 254. The suitable analog or digital modulation technique may include amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable modulation technique that will be apparent to those skilled in the relevant art(s). The modulator module 204 may continue to provide the carrier wave to provide an unmodulated information communication as the transmission information 254 once the transmission information 252 has been transferred to another NFC-capable device. Alternatively, the modulator module 204 may cease to provide the transmission information 254 once the transmission information 252 has been transferred to another NFC-capable device The antenna module 206 applies the transmission information 254 to an inductive coupling element, such as a resonant tuned circuit to provide an example, to generate a magnetic field to provide a transmitted information communication 256. Additionally, another NFC-capable device may inductively couple a received communication signal 258 onto the inductive coupling element to provide a recovered communication signal 260. For example, this other NFC-capable device may respond to the information by modulating its corresponding antenna with its corresponding information to modulate the carrier wave to provide the received communication signal 258. As another example, this other NFC-capable device may modulate its corresponding information onto its corresponding carrier wave and generate its corresponding magnetic field by applying this modulated information communication to its corresponding antenna to provide the received communication signal 258.

The demodulator module 208 demodulates the recovered communication signal 260 using any suitable analog or digital modulation technique to provide reception information 262. The suitable analog or digital de-modulation technique may include amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable modulation technique that will be apparent to those skilled in the relevant art(s).

Typically, the controller mode provides the reception information 262 as recovered information 266 to the data store, the user interface, and/or other electrical devices or host devices. However, the controller module 202 may also use the reception information 262 to control the overall operation and/or configuration of the NFC device 200. The reception information 262 may include one or more commands and/or data. The controller module 202 may issue and/or execute the one or more commands to control the overall operation and/or configuration of the NFC device 200. For example, the controller module 202 may issue and/or execute the one or more commands in accordance with the data, if appropriate, to control operations of the NFC device 200, such as a transmission power, a transmission data rate, a transmission frequency, a modulation scheme, a bit and/or a byte encoding scheme and/or any other suitable operation parameter that will be apparent to those skilled in the relevant art(s) without departing from the spirit and scope of the invention, of other NFC-capable devices.

Additionally, the controller module 202 formats the reception information 262 into a suitable format for transmission to the data store, the user interface, and/or other electrical devices or host devices, and may perform error decoding, such as cyclic redundancy check (CRC) decoding to provide an example, on the reception information 262 to provide recovered information 266.

Some NFC devices 200 may also include a power harvesting module 268. The power harvesting module 268 may harvest a power source from the received communication signal 258. The power source may include sufficient power to adequately operate the controller module 202, the modulator module 204, the antenna module 206, and/or the demodulator module 208.

Communication device that includes NFC device 200 may be an electronic device, such as a portable computing device under a control of a user. Example electronic devices may include, without limitation, personal computers, mobile communication devices, (e.g. smart phones, tablet computing devices, notebooks), etc. Electronic devices typically include a casing on some or all sides of the electronic device, to protect the NFC device, processor, memory, and other electronic components integral to the functionality of the electronic device.

In an embodiment, the one or more casings on the electronic device may be configured to activate and deactivate the tag mode of NFC device 200. The casings may be configured to activate the tag mode functionality of NFC device 200 and/or passive peer to peer mode functionality of NFC device 200 (although the examples below are described in terms of the tag mode functionality for the ease of understanding the invention) when a user is holding the electronic device in a way that is transparent to the user. For example, when a user holds a device, a user may come into contact with multiple casings. When the electronic device determines that a user comes into contact with multiple casing, the tag mode device may be activated. Similarly, when the electronic device determines that a user does not come into contact with any casings, or with a number of casings that is less than a predefined threshold, the tag mode on NFC device deactivates. This functionality prevents the user of the electronic device becoming a victim to the electronic pick-pocketing described above.

Figure 3:
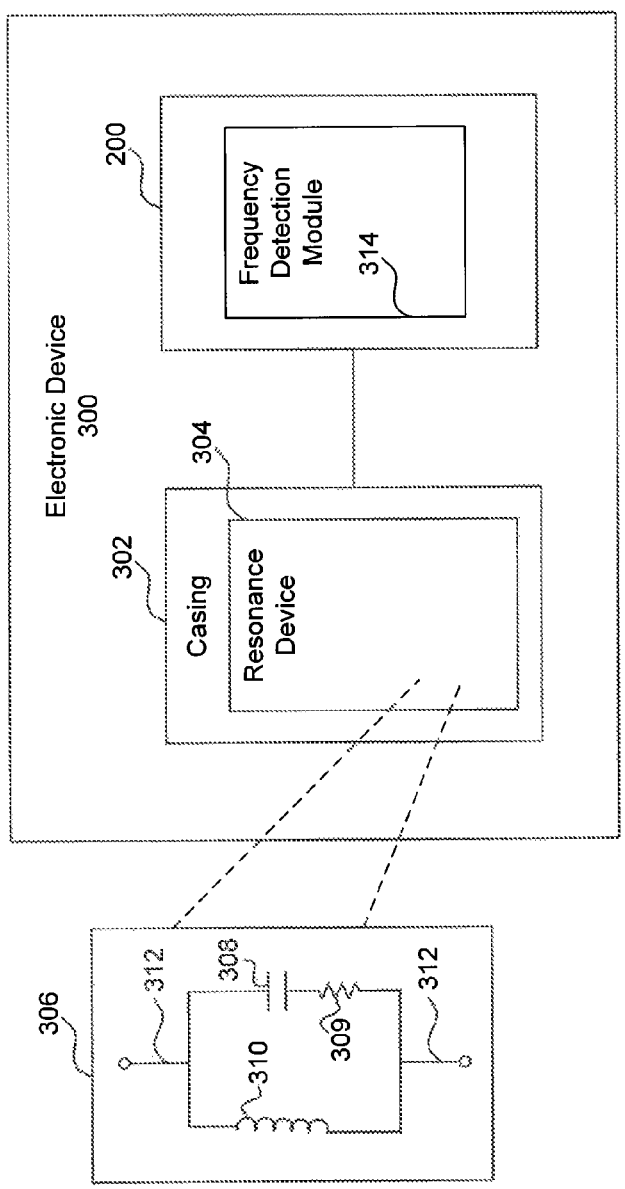
FIG. 3 illustrates a block diagram of an electronic device that includes a resonance device for activating an NFC device, according to an exemplary embodiment of the invention.

FIG. 3 illustrates a block diagram of an electronic device 300 that includes a resonance detector for activating an NFC device, according to an exemplary embodiment of the invention. Although the block diagram described herein includes a single casing 302 of electronic device 300, a person skilled in the art will appreciate that electronic device may include multiple casings that include the embodiments of the present invention. Casing 302 may be a casing made of a plastic material, metallic material, or other material known to a person skilled in the relevant art.

The side of casing 302 internal to electronic device 300 includes a resonance device 304. Resonance device 304 may include conductive ink. A person skilled in the art will appreciate that the conductive ink is a material that may be a fired high solids system or a polymer thick film (PTF) system. Conductive ink allows circuits to be drawn or printed on a variety of substrate materials that contain conductive materials, such as, for example, powered or flaked silver, or carbon-like materials.

In another embodiment, resonance device 304 includes a printed circuit board ("PCB"). A person skilled in the art will appreciate that a PCB connects electronic components using conductive pathways, tracks or signal traces etched from copper sheets laminated onto a non-conductive substrate. Example PCB boards may include a printed wiring board (PWB), etched wiring board, or a printed circuit board assembly (PCBA).

Resonance device includes an oscillating circuit 306. In an embodiment, oscillating circuit 306 may be printed on a conductive ink. In another embodiment, oscillating circuit 306 may be printed on the PCB board.

Example oscillating circuit 306 includes a capacitor 308, a resistor 309, an inductor 310, and a voltage differential 312. A person skilled in the art will appreciate that this embodiment of oscillating circuit 306 is not limiting, and other types of oscillating circuits may be used.

Oscillating circuit 306 uses capacitor 308 as a tuning element. When a user of electronic device 300 holds electronic device 300 with his hand(s), the proximity of the hand(s) adds a dielectric or a polarization component to capacitor 308. The dielectric or polarization component increases the capacitance of capacitor 308, and is indicative that electronic device 300 is being held by the user, as opposed to being carried in a bag or a briefcase. When the user of electronic device 300 ends contact with electronic device 300, by for example, putting electronic device 300 into a bag or a briefcase, the capacitance on capacitor 308 decreases.

A person skilled in the art will appreciate that an increase in capacitance is proportional to a decrease in a frequency of oscillating circuit 306. To measure the increase and decrease of the capacitance on capacitor 308, oscillating circuit may be connected to a frequency detection module 314.

Frequency detection module may be housed on NFC device 200 or on electronic device 300. Example, frequency detection module 314 may include an analog edge detector or a digital counting circuit. Frequency detection module 314 may enable and disable the tag mode on NFC device 200. For example, when a user holds electronic device 300, the capacitance on capacitor 308 increases. This results in a decrease of the frequency of oscillating circuit 306. When frequency decreases below a predefined threshold, frequency detection module may send a signal to NFC device 200 to activate the tag mode.

When the user completes using electronic device 300 and places electronic device back into a bag or a briefcase, the user no longer touches the casing and the capacitance across capacitor 308 decreases. The decrease of the capacitance is associated with an increase in frequency of oscillating circuit 306. When the frequency increases above a predefined threshold, frequency detection module 314 sends a signal to controller 202 to disable the tag mode on NFC device 200, so that the NFC device 200 does not respond to an electronic attack.

In an embodiment, the decrease in frequency below a predefined threshold on multiple casings is indicative that a device is being held. For example, when a user holds electronic device 300, the user may come into contact with several casings 302 of electronic device 300. Thus, in an embodiment, a capacitance on a predetermined number of casings 302 must increase before the tag mode on NFC device 200 is activated. Similarly, when capacitance on a predetermined number of casings 302 falls below a predefined threshold, the tag mode on NFC device 200 deactivates.

Figure 4:
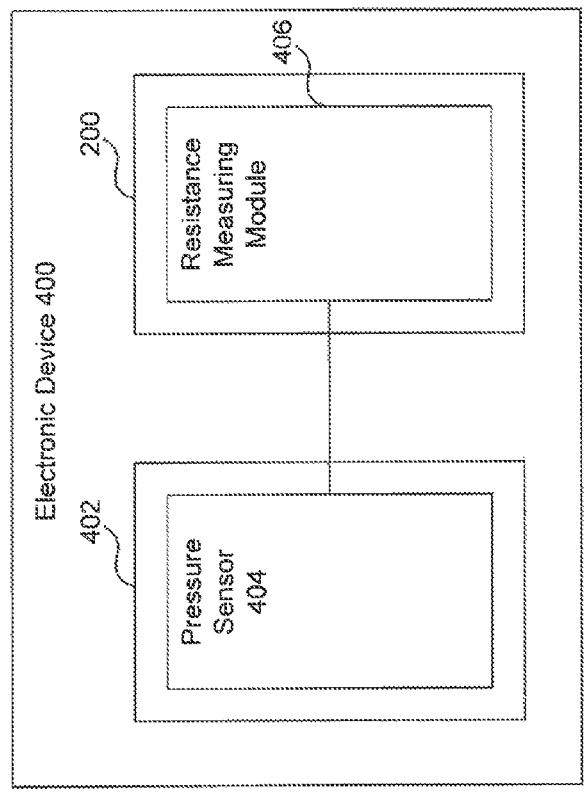
FIG. 4 illustrates a block diagram of an electronic device that includes a pressure sensor for activating an NFC device, according to an exemplary embodiment of the invention.

FIG. 4 illustrates a block diagram of an electronic device 400 that includes a pressure sensor for activating an NFC device, according to an exemplary embodiment of the invention. Although, the block diagram described herein includes a single casing 402, electronic device 400 may include multiple casings 402.

The side of casing 402 internal to electronic device 400 includes a pressure sensor 404. In an embodiment, pressure sensor 404 may be located on one or more casings 402. Pressure sensor 404 measures pressure that is exerted on each casing 402.

Pressure sensor 404 may include quantum tunneling composites (QTCs). A QTC includes composite metals as conductive elements and a non-conducting elastomeric binder as an insulator. A person skilled in the art will appreciate that a QTC utilizes quantum tunneling, where, when pressure is not applied to, the conductive elements are insulated from each other by a non-conducting elastomeric binder as they are too far apart to conduct electricity. When a user applies pressure to casing 402, the conductive elements become closer and the electrons may tunnel through the insulator and carry the electric charge from one conductive element to the other. Once the electricity begins to pass from one conductive metal to another, the resistance of the QTC increases exponentially.

In an embodiment, NFC device 200 includes a resistance measuring module 406. Resistance measuring module 406 measures resistance that a user applies to casings 402 located on various sides of electronic device 400. When a user of electronic device 400 is holding electronic device 400, the user exerts pressure on one or more casings 402. Resistance measuring module 406 measures the resistance exerted on each casing 402, and when the resistance of one or more casings 402 increases above a predefined threshold, resistance measuring module 406 sends a signal to controller 202 of NFC device 200 to enable the tag mode.

Similarly, when resistance measuring module 406 determines that the resistance on one or more casings 402 falls below a predefined threshold, resistance measuring module 406 sends a signal to controller 202 to disable the tag mode on NFC device 200.

In an embodiment, resistance measuring module 406 may detect an increase in resistance on multiple casing 402 that are parallel to each other. Enabling tag mode when resistance measuring module 406 determines an increase in resistance on parallel casings 402 may avoid enabling the tag mode when electronic device 400 is laying on a table or in a bottom of a bag and has pressure exerted on a single casing 402.

Figure 5:
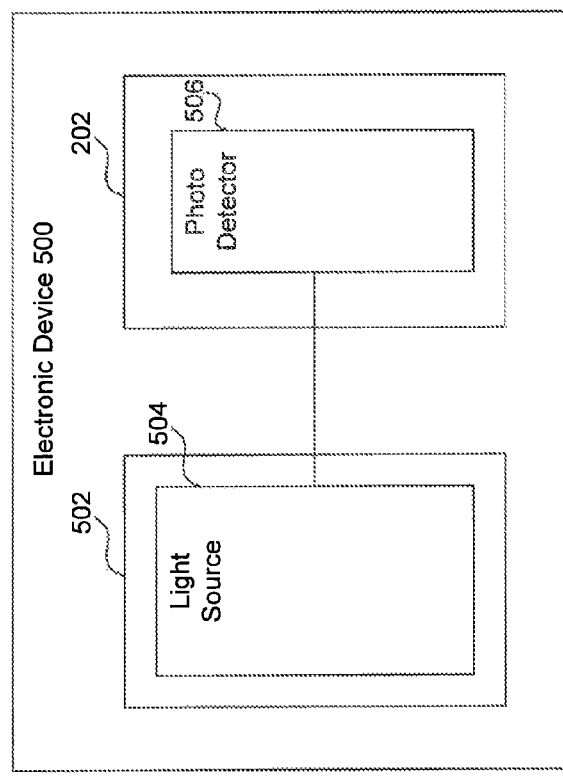
FIG. 5 illustrates a block diagram of an electronic device that includes an optical detector for activating an NFC device, according to an exemplary embodiment of the invention.

FIG. 5 illustrates a block diagram of an electronic device 500 that includes a photodetector for activating an NFC device, according to an exemplary embodiment of the invention. As in the previous embodiments, the block diagram described herein includes a single casing 502. However, electronic device 500 may include multiple casings 502.

The side of casing 502 internal to electronic device 500 includes a light source 504. Light sources 504 may be located on one or more casings 502 of electronic device 500. In an embodiment, casings 502 allow light source 504 to emit light outside of electronic device 500, through, for example, a transparent casing 502 or an opening in the casing that may be carved out for light source 504. Light source 504 may be any light producing source, such as, without limitation, a laser, an infra-red LED, or another source known to a person skilled in the art that emits light. In an embodiment, the light source 504 emits light such that the user is not aware that the light is being emitted.

In an embodiment, electronic device 500 or NFC device 200 included on electronic device 500 includes a photodetector 506. Photodetector 506 is a device that senses light or other electromagnetic energy associated with light or light intensity. Example, photodetector 506 may be a photodiode or an amplifier circuit that detects, for example, an infra-red light, laser light, changes in light intensity, etc.

When light source 504 emits light through casing 502, the light may be reflected at a certain rate. For example, the farther the object that reflects the light emitted from light source 504, the more time it takes for the light to reflect and travel back to electronic device 500. When a user is holding electronic device 500 the rate of reflection is affected by the proximity of a hand of a user to electronic device 500.

Photodetector 506 determines the rate of reflection of the light when light sources 504 emits the light and the light reflects from the hand of a user. When a rate of reflection meets a predefined threshold, photodetector 506 sends a signal to controller 202 to activate tag mode on NFC device 200. Similarly, when a user places electronic device 500 in a bag, the rate of reflection decreases and photodetector 506 sends a signal to controller 202 to disable the tag mode on NFC device 200.

In an embodiment, the photodetector 506 may determine the rate of reflection from the light sources 504 that emit light from multiple casings 502. For example, when a user holds electronic device 500, the user may come into contact with several casings 502 of electronic device 500. Thus, in an embodiment, a rate of reflection from a predetermined number of casings 502 must meet a predetermined threshold before NFC device 200 may be activated. Similarly, when a rate of reflection meets a predefined threshold on a fewer casings 502 then a predetermined number of casing 502, tag mode on NFC device 200 may deactivate.

In another embodiment, photodetector 506 may detect ambient light that electronic device 500 may receive through an opening in multiple casings 502. In this embodiment, light source 504 may not be present in electronic device 500 or may not be turned on. When photodetector 506 detects ambient light from an opening in multiple casings 502 that is above a predefined threshold, photodetector 506 sends a signal to controller 202 to activate tag mode on NFC device 200. A person skilled in the art will appreciate that photodetector 506 may receive ambient light when a user retrieves electronic device 500 from a bag, a brief case, or from a desk.

In another embodiment photodetector 506 may detect when electronic device 500 receives little or no light. For example, when electronic device 500 is in a bag or inside a drawer of a desk, the openings in multiple casing 502 may receive little to no light. When the amount of detected light falls below a predefined threshold, photodetector 506 sends a signal to controller 202 that disables the tag mode on NFC device 200.

Figure 6:
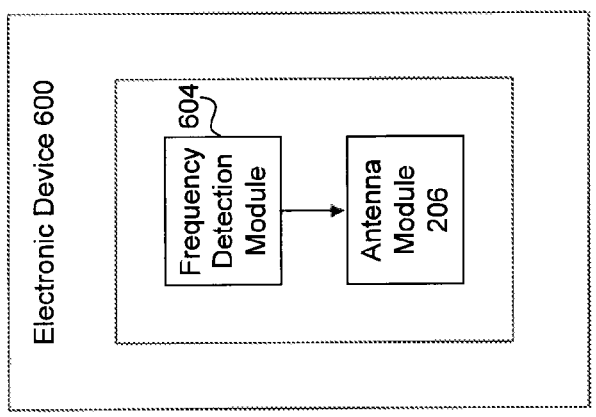
FIG. 6 illustrates a block diagram of an electronic device that includes a frequency detector for activating an NFC device, according to an exemplary embodiment of the invention.

FIG. 6 illustrates a block diagram of an electronic device 600 that includes a frequency detection module for activating an NFC device, according to an exemplary embodiment of the invention.

NFC device 200 may also be housed on an electronic device 600 that includes a frequency detection module 604 that is communicatively coupled to antenna module 206 described herein.

Frequency detection module 604 measures the changes in tuned frequency that is emitted by antenna module 206. For example, when a user touches the antenna or components of the antenna on electronic device 600, antenna module 206 causes a change in an at least one characteristic impedance of at least one antenna component. The changes in characteristic impedance reflect the change in a frequency of the antenna associated with NFC device 200.

Frequency detection module 604 measures the change in frequency response of the antenna. When frequency detection module 604 determines that a change in frequency response is greater than the predefined threshold, frequency detection module 604 sends a signal to controller 202 to activate the tag mode on NFC device 200. Similarly, when a user completes using electronic device 600 and does not touch the antenna on electronic device 600, the frequency response falls below a predefined threshold and frequency detection module 604 sends a signal to controller 202 to disable the tag mode on NFC device 200.

Figure 7:
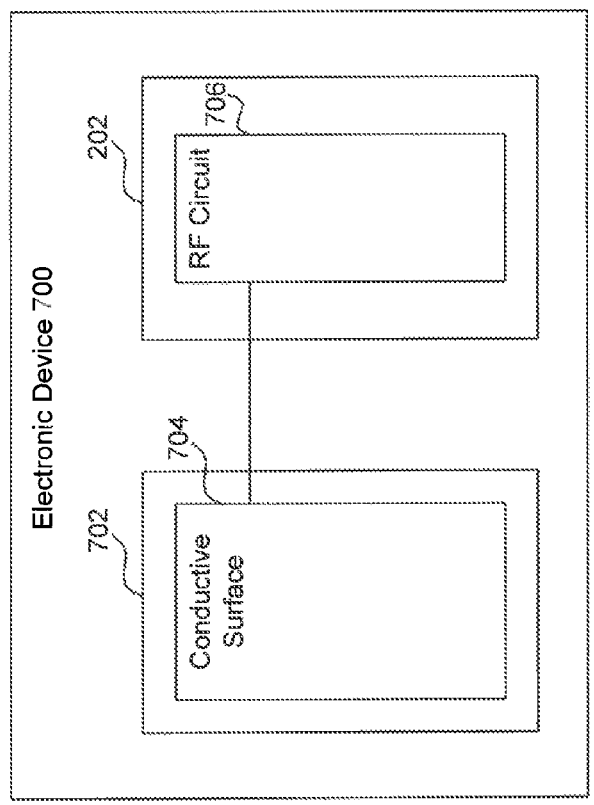
FIG. 7 illustrates a block diagram of an electronic device that includes a conductive casing for activating an NFC device, according to an exemplary embodiment of the invention.

FIG. 7 illustrates a block diagram of an electronic device 700 that includes a conductive casing to activate an NFC device, according to an exemplary embodiment of the invention. As in the previous embodiments, the block diagram described herein includes a single casing 702, electronic device 700 may include multiple casings 702.

The outside surface of casing 702 may include a conductive surface 704. Conductive surface 704 may, for example, become conductive when electronic device 700 is picked up by a user.

Casing 702 that includes conductive surface 704 may be connected to a receiver frequency (RF) circuit 706. In an embodiment, RF circuit may be included on NEC device 200 or electronic device 700. A person skilled in the art will appreciate that RF circuit 706 is an electronic circuit that receives and processes a frequency signal from an antenna. Example RF circuit 706 may be a radio frequency circuit that may be configured to receive FM band radio or a mains hum of approximately 50 Hz.

When a user holds electronic device 700 and comes into contact with conductive surface 704, the body of the user acts as an antenna. The body acting as an antenna increases the frequency signal emitted by electronic device 700 and detected by RF circuit 706.

When the frequency signal detected by RF circuit 706 increases above a predefined threshold, RF circuit 706 sends a signal to controller 202 to activate the tag mode on NFC device 200. Similarly, when a user completes using electronic device 700 and places electronic device 700 into a bag or a pocket, the frequency decreases below a predefined threshold. When RF circuit 706 detects a decrease in frequency, RF circuit 706 sends a signal to controller 202 to disable the tag mode on NFC device 200.

FIGS. 8A-B illustrate a block diagram of an electronic device 800 (e.g., a cell phone) that includes a conductive material on casings to activate an NFC device, according to an exemplary embodiment of the invention. FIG. 8A is an embodiment of a mobile device 800 that includes a front casing 802A and a back casing 802B. This is a so called clamshell case. However, the invention is not so limited, and any configuration of an electronic device is contemplated. The external surface of front casing 802A and back casing 802B includes a conductive material 804. Example conductive material 804 on casings 802A and 802B may be carbon loaded plastic strip. In an embodiment, insulated material 806 surrounds conductive material 804 on each casing 802A and 802B. Although, FIG. 8A displays a casing 802A, a person skilled in the relevant art will appreciate that casing 802B may include similar features. A person skilled in the art may also appreciate that conductive material 804 may be included on other casings of electronic device 800. For example, an electronic device could have two more conductive elements, which are insulated from each other, on opposite sides of the device. In one embodiment, the conductive elements are parallel to one another.

FIG. 8B illustrates components of an electronic device 800 that includes a conductive casing to activate an NFC device, according to an exemplary embodiment of the invention. For example, conductive material 804 on casings 802A and 802B may be connected to a device that measures resistance, such as an ohmmeter 808. In an embodiment, ohmmeter 808 may be included on NFC device 200 or electronic device 800. Because insulating material 806 surrounds conductive material 804 on casings 802A and 802B ohmmeter 808 may measure resistance of several mega ohms between casings 802A and 802B.

When a user holds electronic device 800, a user touches conductive material 804 on casing 802A and 802B simultaneously. This causes a shorting of insulating material 806 of casings 802A and 802B, and a current flow between conductive materials 804 on casings 802A and 802B through the body of a user.

Because, when a user holds electronic device 800 the current begins to flow between casings 802A and 802B, the resistance between casings 802A and 802B drops, such that ohmmeter 808 may measure resistance of 20 k to 100 k ohms. When ohmmeter 808 detects a decrease in resistance between conductive materials 804 on casings 802A and 802B that is below a predefined threshold, ohmmeter 808 sends a signal to controller 202 to activate the tag mode on NFC device 200.

Similarly, when a user completes using electronic device 800 and places electronic device 800 into a bag or a pocket, the resistance between conductive material 804 on casings 802A and 802B increases. For example, the user no longer serves as a conductor between conductive material 804 on casings 802A and 802B, which is surrounded by insulating material 806. When ohmmeter 808 detects an increase in resistance that is above a predefined threshold, ohmmeter 808 sends a signal to controller 202 to disable the tag mode on NFC device 200.

FIG. 9 is a flowchart of a method 900 for activating an NFC device, according to an exemplary embodiment of the invention.

At step 902, an input signal is received. For example, electronic devices 300-800 receive an input signal that may cause controller 202 to activate the tag mode on NFC device 200. For example, resonance detector 304 may receive electronic current, pressure sensor 404 may receive a pressure input, photodetector 506 may receive a light input, frequency detection module 604 may receive a frequency input, and RF circuit 706 may receive a frequency input associated with a human body acting as an antenna.

At step 904, the strength of an input signal is determined. For example, resonance detector 304 determines the strength of an electric current, pressure sensor 404 may determine the amount of pressure that is applied to casing 402, photodetector 506 may determine the amount of light that is reflected through casing 502, frequency detection module 604 determines the strength of the frequency input and RF circuit 706 may determine the strength of a radio frequency input.

At step 906, a determination is made as to whether the input signal meets a predefined threshold. If the input signal meets a predefined threshold, method 900 proceeds to step 908, otherwise to step 910.

At step 908, a tag mode on NFC device is enabled. For example, controller 202 receives a signal to activate the tag mode on NFC device 200, as described herein.

At step 910, an NFC device is disabled. For example, controller 202 receives a signal to disable the tag mode on NFC device 200.

CONCLUSION

It is to be appreciated that the Detailed Description section, and not the Abstract section, is intended to be used to interpret the claims. The Abstract section may set forth one or more, but not all exemplary embodiments, of the invention, and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus the invention should not be limited by any of the above-described exemplary embodiments, but should be defined only in accordance with the following claims and their equivalents.

What is claimed is:

1. A system for activating an NFC device, comprising:
   a sensor module, configured to receive an input signal, wherein the input signal is generated by a user contact with an electronic device; and
   a measuring module, configured to:
   measure the strength of the input signal;
   determine whether the input signal meets a predefined threshold;
   activate the NFC device included within the electronic device when the input signal meets a predefined threshold; and
   deactivate the NFC device when the input signal does not meet the predefined threshold, and
   wherein communication between the NFC device and another NFC device only occurs when the input signal generated by the user contact meets the predefined threshold.

2. The system of claim 1, wherein the measuring module is further configured to activate a tag mode on the NFC device.

3. The system of claim 1, wherein the measuring module is further configured to deactivate a tag mode on the NFC device.

4. The system of claim 1, further comprising:
   a plurality of casings, wherein each casing includes the sensor module.

5. The system of claim 1, wherein the sensor module is a resonance device that includes an oscillating circuit and the measuring module includes a frequency detection module.

6. The system of claim 5, wherein the resonance device includes a conductive ink.

7. The system of claim 5, wherein the resonance device includes a printed circuit board (PCB).

8. The system of claim 1, wherein the sensor module is a pressure sensor and the measuring module is a resistance measuring module.

9. The system of claim 1, further comprising a light source configured to emit light and wherein the measuring module is a photodetector.

10. The system of claim 1, wherein the measuring module is a frequency detection module that measures the change in the frequency emitted by an antenna module.

11. The system of claim 1, wherein the sensor module includes a conductive surface and wherein the measuring module is an RF circuit.

12. A computer-implemented method for activating an NFC device comprising:
 sensing an input signal, wherein the input signal is generated by a user contact with an electronic device;
 measuring the strength of the input signal;
 determining whether the strength of the input signal meets a predefined threshold;
 activating the NFC device that is included within an electronic device when the input signal meets the predefined threshold; and
 deactivating the NFC device when the input signal does not meet the predefined threshold, and
 wherein communication between the NFC device and another NFC device only occurs when the input signal generated by the user contact meets the predefined threshold.

13. The method of claim 12, further comprising sensing a plurality of input signals from a plurality of casings attached to the electronic device.

14. The method of claim 12, wherein the activating further comprises activating a tag mode on the NFC device.

15. The method of claim 12, wherein the deactivating further comprises deactivating a tag mode on the NFC device.

16. The method of claim 12, wherein the measuring further comprises measuring a change in frequency.

17. The method of claim 12, wherein the sensing further comprises sensing a change in a tuning element.

18. The method of claim 12, wherein the measuring further comprises measuring resistance of an electric circuit.

19. The method of claim 12, wherein the sensing further comprises sensing pressure on a casing of the electronic device.

20. The method of claim 12, wherein the sensing further comprises sensing a light reflected from a light source.

21. The method of claim 12, wherein the measuring further comprises measuring the rate of reflection of a light reflected from a light source.

22. A non-transitory computer readable medium having instructions retrieved thereon that, when executed by a computing device, cause the computing device to perform operations for activating an NFC device comprising:
 sensing an input signal, wherein the input signal is generated by a user contact with an electronic device;
 measuring the strength of the input signal;
 determining whether the strength of the input signal meets a predefined threshold;
 activating the NFC device that is included within the electronic device when the input signal meets the predefined threshold; and
 deactivating the NFC device when the input signal does not meet the predefined threshold, and
 wherein communication between the NFC device and another NFC device only occurs when the input signal generated by the user contact meets the predefined threshold.

23. A system for activating an NFC device, comprising:
 a plurality of sensor modules that include a conductive material on a plurality of casings on an electronic device, wherein each sensor module is configured to receive an input signal, the input signal is generated by a user contact with conductive material on each casing;
 an insulating material that surrounds each sensor module; and
 a measuring module, configured to:
  measure the strength of the input signal;
  determine whether the input signal meets a predefined threshold;
  activate the NFC device included within the electronic device when the input signal meets a predefined threshold when contact with the electronic device occurs; and
  deactivate the NFC device when the input signal does not meet the predefined threshold,
  wherein communication between the NFC device and another NFC device only occurs when the input signal generated by the user contact meets the predefined threshold.

24. The system of claim 23, wherein at least two of the sensor modules are in parallel and each sensor module senses shorting when contact occurs with the electronic device on each casing that includes the respective sensor module.

25. The system of claim 23, wherein the measuring module is an ohmmeter.

* * * * *

UNITED STATES PATENT AND TRADEMARK OFFICE
CERTIFICATE OF CORRECTION

PATENT NO. : 9,209,867 B2
APPLICATION NO. : 13/171023
DATED : December 8, 2015
INVENTOR(S) : Royston Page 1 of 1

It is certified that error appears in the above-identified patent and that said Letters Patent is hereby corrected as shown below:

In the claims

Column 14, line 39, claim 1, replace "meets a predefined" with --meets the predefined--.
Column 16, line 30, claim 23, replace "meets a predefined" with --meets the predefined--.

Signed and Sealed this
Twenty-ninth Day of March, 2016

Michelle K. Lee
*Director of the United States Patent and Trademark Office*